United States Patent Office 3,530,079
Patented Sept. 22, 1970

3,530,079
REINFORCED ELASTOMER FOAM COMPOSITIONS
John M. Iwasyk and Francis W. Doherty, Wilmington, Del., assignors to E. I. du Pont de Nemours and Company, Wilmington, Del., a corporation of Delaware
No Drawing. Filed Aug. 1, 1966, Ser. No. 569,027
Int. Cl. C08c *17/08;* C08j *1/16*
U.S. Cl. 260—2.5                                    8 Claims

ABSTRACT OF THE DISCLOSURE

Foam rubber compositions having improved strength and stability, comprising an elastomer, such as neoprene, and alkali metal titanate particles of a diameter below 3.0 microns and a length to diameter ratio of at least 10.

---

This invention relates to improved, stabilized foam rubber compositions containing an alkali metal titanate as a foaming and reinforcing agent and to novel methods for their preparation.

More particularly, the invention pertains to reinforced, strengthened and stabilized elastomeric foam compositions obtained from natural and synthetic rubber in which is dispersed from about 2.5 to 15% by weight of a foaming agent comprising dialkali metal titanate particles having diameters in the range of 0.005 micron to 3.0 microns and length to diameter ratios equal to or greater than 10, said titanate being adapted to reinforce the foam composition and desirably impart thereto a stabilizing and strengthening effect.

In certain foam applications it is essential that the foam composition be in stabilized condition, e.g. that it shall not decay or collapse. It is known that soap and some fine precipitates exert a stabilizing effect on foams ("Foams; Theory and Industrial Applications" by J. J. Bikerman, pp. 65, 67 and 68). It is also known that various reinforcing agents, such as spherical plastic particles, kaolin, and magnesium silicate, starch esters and ethers, etc. can be used in elastomeric foams.

It has now been discovered that the presence of dispersed dialkali metal titanate particles in an elastomer foam composition provide excellent, improved foaming and reinforcing agents over prior art stabilizing and reinforcing compounds, and that they advantageously stabilize, strengthen, and reinforce the final foam composition product. As a result a unique, reinforced natural or synthetic foam rubber product is obtained inherently possessing improved compressive strength, volume and mold shrinkage properties and exceptional load-bearing characteristics.

Dialkali metal titanates are well known. Their nature and methods for their preparation being described, for example, in U.S. Pats. 2,833,620, 2,841,470 and 3,129,105. Particles useful as foaming and reinforcing agents in this invention can be classed as alkali metal polytitanates with the chemical composition $M_2O(TiO_2)_n$ in which $n$ ranges from 3 to 16 and M is an alkali metal (sodium, potassium, and cesium) and preferably is sodium or potassium. Their predominant crystal types are the tetratitanates, $M_2O(TiO_2)_4$, and hexatitanates, $M_2O(TiO_2)_6$, in which M is an alkali metal, particularly sodium or potassium. They exist in three types and three size ranges. All, including various mixtures thereof, are utilizable in the invention. That is, they are made up of either the fibrous type having diameters in the range of 0.6 to 3.0 microns and length to diameter ratios of 100 to 1 to 1,000 to 1; the pigmentary type having diameters in the range of 0.01 to 1.0 micron and length to width ratios of 10 to 1 to 100 to 1; and the amorphous type, with diameters of 0.005 to 0.01 micron and length to diameter ratios equal to or greater than 10 to 1. For certain applications as will be later described, one type proves more preferable for use over another type.

The use of natural and synthetic rubber latices for the manufacture of foam rubber products is well known. (Latex—Natural and Synthetic by P. G. Cook, p. 169, Reinhold, 1959.) The basic ingredients of an elastomer foam composition comprise latex, a rubber-like polymer in emulsified form, either natural or synthetic, e.g. obtained from the polymerization of 2-chlorobutadiene-1:3 or butadiene 1:3 and styrene or butadiene; a stabilizing or foaming agent such as soap (potassium or sodium salts of oleic or rosin acids); a gelling or delayed coagulant, such as sodium silicofluoride, and the usual vulcanizing materials such as sulfur and accelerators; an antioxidant; a sensitizer to control shrinkage and prevent collapse; zinc oxide dispersion and any other desired compound ingredients, such as pigments, reodorants and fillers, such as clays, zeolite, etc. should a high density foam be desired. The use of all these additives is well understood in the art.

In accordance with this invention lighter reinforced foam rubber products exhibiting 30% reduced density and load-bearing characteristics equal to unreinforced foams and improved compressive strength and mold shrinkage characteristics are obtained by dispersing sufficient dialkali metal titanate particles of the type mentioned in a natural or synthetic latex concentrate to provide in the final product from 2.5 to 15% by weight and preferably from 8.0 to 11.5% by weight of said titanate.

In the production of these improved foams, recourse can be had to any conventional process, e.g. to the well-known Dunlop whipping and gelling process, as disclosed in U.S. 1,852,447 and 1,994,503, or to the Talalay method, disclosed in U.S. 2,432,353.

In the latter process catalytic decomposition of hydrogen peroxide causes the latex to froth due to gas evolved, following which the latex is rapidly frozen and then coagulated by being permeated with carbon dioxide. In either process vulcanization is undertaken after gelling or coagulating.

In one specific adaptation of the invention metal titanate particles having diameters in the range of 0.1 to 1.0 micron and length to diameter ratios equal to or greater than 10, and preferably pigmentary size potassium titanate, are added to elastomeric latices selected from natural latex, neoprene latex, and styrene-butadiene latex prior to the frothing, along with the proper and desired amounts of other ingredients mentioned and essential to foam compound formation. The mixture is then whipped in a power driven beater to obtain an air-filled foamy mass. This can be carried out batch-wise or effected in a continuous foamer wherein the base latex compound, zinc oxide and titanate can be metered into the mixing chamber as desired. Delayed coagulant addition is then effected and the whipped and gelled mass is poured or otherwise charged into an associated mold of a size and shape desired in the final product. The sponge coagulum is then vulcanized, normally in an atmosphere of steam, and the vulcanized product is washed to remove unnecessary salts and soap as well as to eliminate undesired residues. Thereafter it is air dried in an oven and is ready for use in manufacturing such useful articles as seat cushions for home, automobile or other vehicles, furniture upholstery, and in mattresses, pillows, sponges, etc.

To a clearer understanding of the invention the following specific examples are given. These are merely illustrative and are not to be construed as limiting the scope of the invention.

EXAMPLE I

A series of 1-inch thick neoprene foams having densities and filler contents as shown in Table I below, were prepared by the Dunlop type process from the following latex formulation:

| Ingredient: | Amount used, dry wt. basis |
|---|---|
| Neoprene Latex 60 (60%) | 100 |
| Commercial wax emulsion, petrolatum liquid (40%) | 3 |
| Pigment masterbatch (60%), zinc oxide 7.5, rubber antioxidant 2.0 (phenyl-beta-naphthylamine) | 9.5 |
| Trialkyl thiourea (60%) | 2.0 |
| Filler as shown in Table I. | |
| Gelling agent mixture: | |
| Catechol (20%) (ortho di-hydroxy benzene) | 1.0 |
| Sodium silicofluoride (20%) | 2.0 |
| Foam stabilizer | 0.1 |

In processing the foams, a "Kitchen Aid" type beater was employed in the frothing step. In instances of pigmentary potassium titanate incorporation in the latex this was effected in the dry state and just prior to frothing. After addition of the gelling agent, the froth was cast into molds, cured 30 mins. at 5 p.s.i. steam, and then dried and cured 4 hrs. at 250° F. in an air oven.

As will be noted in the table, the addition of pigmentary potassium titanate to the foams gave major improvements in the volume shrinkage. Pigmentary potassium titanate present in 10 phr. (parts per hundred parts of resin) or 7.8 wt. percent, reduced volume shrinkage by ⅓; at 15 phr. or 11.3 wt. percent, volume shrinkage was reduced by ½. The control filler, diatomaceous earth, provided either no improvement in volume shrinkage or but very slight improvement.

The compression characteristics of the foams were determined by the ASTM D575 Method A, entitled "Compression Test at Specified Deflection." This is a compression test in which the load required to cause a specified deflection is determined. As shown in Table I pigmentary potassium titanate reinforcement imparts major improvements in load bearing capacity. At equal density, the pigmentary potassium titanate reinforced foams have up to twice the load bearing capacity of conventional foams for a given deformation.

Furthermore, the pigmentary potassium titanate reinforcement allowed a reduction of foam density by 30% while still maintaining equal load bearing characteristics of the heavier unreinforced foams. The control filler, diatomaceous earth, gave very little reinforcement.

EXAMPLE II 1-inch thick natural rubber test foams having the densities and filler content shown in Table I were prepared in the manner described in Example I from the following latex formulation, with the cast foams being cured 30 minutes at 5 p.s.i. steam and dried and cured 3 hrs. in an air oven at 158° F.

| Ingredient: | Amount used—dry wt. basis |
|---|---|
| Deammoniated natural latex (62%) | 100 |
| Potassium oleate soap (20%) | 1 |
| Zinc diethyl dithiocarbamate (50%) | 0.75 |
| Sulfur (50%) | 0.5 |
| Mature above 16–20 hrs. at 75° F. then add | |
| rubber antioxidant (50%) | 1.0 |
| Zinc diethyl dithiocarbamate (50%) | 0.25 |
| Rubber accelerator (50%) (zinc salt of 2-mercaptobenzothiazole) | 1.0 |
| Sulfur (50%) | 1.5 |
| Trimene base (rubber accelerator, reaction product of ethyl chloride, formaldehyde, and $NH_3$) (50%) | 1.0 |
| Filler as shown in Table I. | |
| Gelling agent mixture: | |
| Zinc oxide (50%) | 5.0 |
| Sodium silicofluoride (20%) | 1–1.5 |

As shown in Table I below, pigmentary potassium titanate present in 10 phr. or 8.1 wt. percent gave 30 to 47% lower volume shrinkage than the unfilled control foams. The load-bearing capacity of the titanate-reinforced foams was 40 to 70% higher than control foams of the same density (Table I). Pigmentary potassium titanate present in 10 phr. allows a 15% decrease in foam density for equal load bearing capacity at a given deformation.

EXAMPLE III 1-inch thick butadiene-styrene rubber (SBR) test foams, having the densities and filler content shown in Table I below were prepared following the procedures of Example II, using the following latex formulation:

| Ingredients: | Amount used—dry wt. basis |
|---|---|
| Butadiene-styrene copolymer (60%) | 100 |
| Rubber antioxidant (50%) (a fortified hindered phenol) | 1.0 |
| Rubber accelerator (as in Example II) (50%) | 0.5 |
| Sulfur (50%) | 2.0 |
| Rubber accelerator (as in Example II) (50%) | 1.5 |
| Ethyl zimate (as in Example II) (50%) | 0.5 |
| Gelling agent mixture: | |
| Zinc oxide (50%) | 3.0 |
| Sodium silicofluoride (20%) | 2–3 |

Pigmentary potassium titanate present in 10 phr. or 8.2 wt. percent, reduced the volume shrinkage 50% (Table I) compared with unfilled control foams. The load bearing capacity of the titanate reinforced foams was 36 to 46% higher than control foams of the same

TABLE I.—REINFORCED ELASTOMERS

| Example | Composition of foam | Foam density, lbs/cu. ft. | Volume shrinkage, percent | Pounds per square inch Compressive load to give— | |
|---|---|---|---|---|---|
| | | | | 25 percent deflection | 50 percent deflection |
| I-A | Neoprene latex, no filler | 7.1 | 49 | 0.33 | 0.67 |
| I-B | do | 9.5 | 45 | 0.68 | 1.36 |
| I-C | do | 11.2 | 43 | 0.95 | 1.75 |
| I-D | Neoprene latex, plus diatomaceous earth 10 phr. (7.8 wt. percent) | 7.7 | 51 | 0.32 | 0.80 |
| I-E | do | 10.0 | 44 | 0.79 | 1.71 |
| I-F | do | 11.1 | 40 | 1.30 | 2.30 |
| I-G | Neoprene latex, plus pigmentary potassium titanate 10 phr. (7.8 wt. percent) | 6.1 | 28 | 0.45 | 0.87 |
| I-H | do | 8.1 | 29 | 0.82 | 1.45 |
| I-I | do | 9.5 | 31 | 1.40 | 2.20 |
| I-J | Neoprene latex, plus pigmentary potassium titanate 15 phr. (11.3 wt. percent) | 5.6 | 22 | 0.40 | 0.80 |
| I-K | do | 7.6 | 22 | 0.87 | 1.70 |
| I-L | do | 9.0 | 5.7 | 1.50 | 2.70 |
| II-A | Natural rubber, no filler | 10.2 | 30 | 1.10 | 3.00 |
| II-B | do | 12.3 | 32 | 2.10 | 4.30 |
| II-C | Natural rubber, plus pigmentary potassium titanate 10 phr. (8.1 wt. percent) | 10.7 | 21 | 2.10 | 4.20 |
| II-D | do | 10.8 | 17 | 2.20 | 5.10 |
| III-A | SBR latex, no filler | 7.7 | 23 | 0.90 | 1.65 |
| III-B | do | 9.2 | 21 | 1.35 | 2.30 |
| III-C | SBR latex, plus pigmentary potassium titanate 10 phr. (8.2 wt. percent) | 7.9 | 10 | 1.50 | 2.35 |
| III-D | do | 8.4 | 10 | 1.45 | 2.60 |

Note.—phr. = parts per hundred parts of resin.

density. Pigmentary potassium titanate at 10 phr. allows a 15% decrease in foam density for equal load bearing capacity at a given deformation.

The alkali titanates employed in this invention can be considered as falling into two classifications—that of a foam stabilizer and reinforcing filler. However, unlike other fillers such titanates, particularly pigmentary potassium titanate reinforcement, allows a reduction of foam density by 30% while still maintaining equal load bearing characteristics.

The effectiveness of the contemplated alkali titanates in reinforcing elastomeric foams probably is due to the size of the fibers and their compatibility with the latex foam system. The small size of the fibers allow their incorporation into the thin cellular wall sections of the cured foam to provide desired stiffening and reinforcement. Advantageously, the alkali titanate fibers can be dispersed directly in the elastomeric latices.

As previously indicated uses for these reinforced elastomer foams involve any application where improved load bearing capacity is an advantage, e.g. for pillows, mattresses, automotive pads, etc. The neoprene foams are fire-retardant and thus afford additional usefulness because of this property.

Because of the inherent stabilizing effect of the alkali metal titanates, especially of the pigmentary size, on foams, it is easier to control the processing steps for producing foams. When used in elastomer foams, an economic advantage is afforded—the use of the less expensive titanate as a filler replaces more expensive latex with equal load bearing capacity.

Although specific compounds, amounts, temperatures and times have been mentioned as utilizable in the above examples, the invention is not, as already noted, limited thereto. Thus use is generally contemplated of natural or synthetic latices, as well as mixtures of natural rubber latex and synthetic rubber latex; of mixtures of the various alkali metal titanates mentioned, and of fluorocomplexes generally as gelling agents, e.g. the fluosilicates, fluostannates, fluotitanates and fluozirconates of sodium and potassium. Similarly, potassium oleate and potassium castor oil soap, in amounts of about 1.5% based on the dry rubber content are usually most usefully employable and hence preferred for employment in the invention.

We claim:

1. A foam rubber composition exhibiting improved stability and strength containing dispersed alkali metal titanate particles as an essential reinforcing ingredient, said particles having diameters in the range from .005 micron to 3.0 microns and length to diameter ratios of at least 10, said titanate corresponding to the Formula $M_2O(TiO_2)_n$ where M is an alkali metal and $n$ ranges from 3 to 16.

2. The composition of claim 1 in which the titanate is potassium titanate.

3. The compoistion of claim 1 in which the titanate is sodium titanate.

4. The composition of claim 1 in which the titanate is fibrous potassium titanate having diameters in the range 0.6 micron to 3.0 microns and length to diameter ratios of 100:1 to 1000:1.

5. The composition as in claim 1 in which the titanate consists of pigmentary potassium titanate having diameters in the range 0.01 micron to 1.0 micron and length to diameter ratios of 10:1 to 100:1.

6. The foam composition of claim 1 in which 2.5 to 15 percent by weight of reinforcing alkali metal titanate particles are dispersed in an elastomer foam material selected from the group consisting of polychloroprene foam, natural rubber foam, and styrenebutadiene foam.

7. The reinforced elastomer foam composition of claim 4, containing 8.0 to 11.5 percent by weight of alkali metal titanate particles.

8. The reinforced elastomer foam composition of claim 6 in which the titanate is pigmenttry potassium titanate particles with diameters in the range 0.1 micron to 1.0 micron and length to diameter ratios of at least 10.

References Cited

UNITED STATES PATENTS

| | | |
|---|---|---|
| 2,809,174 | 10/1957 | Dereniuk. |
| 2,964,421 | 12/1960 | Rockoff. |
| 3,129,105 | 4/1964 | Berry et el. _____ 106—55 |
| 3,228,905 | 1/1966 | Talalay et al. |
| 3,325,243 | 6/1967 | Bichowsky _____ 23—51 |
| 3,328,117 | 6/1967 | Emslie _____ 23—51 |

MURRAY TILLMAN, Primary Examiner

M. FOELAK, Assistant Examiner

U.S. Cl. X.R.

106—299; 260—41.5, 723, 725, 746